(12) United States Patent
Zhang

(10) Patent No.: US 7,656,306 B2
(45) Date of Patent: Feb. 2, 2010

(54) CIRCUIT FOR DRIVING NETWORK INDICATOR

(75) Inventor: Xiang Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Haien (TW)

( * ) Notice: Subject to any disclaimer, the term of this patent is extended or adjusted under 35 U.S.C. 154(b) by 640 days.

(21) Appl. No.: 11/308,937

(22) Filed: May 29, 2006

(65) Prior Publication Data
US 2007/0101014 A1 May 3, 2007

(30) Foreign Application Priority Data
Oct. 27, 2005 (CN) .................. 2005 2 0066461

(51) Int. Cl.
*G08B 9/33* (2006.01)
(52) U.S. Cl. .................. 340/815.45; 340/635
(58) Field of Classification Search ........... 340/815.4, 340/540, 635, 815.45
See application file for complete search history.

(56) References Cited

U.S. PATENT DOCUMENTS 5,764,151 A 6/1998 Wu
6,058,427 A * 5/2000 Viswanath et al. .......... 709/231
7,019,658 B1 * 3/2006 Erickson et al. ............. 340/635

* cited by examiner

Primary Examiner—Jeffery Hofsass
(74) Attorney, Agent, or Firm—Wei Te Chung

(57) ABSTRACT

A circuit assembly for indicating statuses of a network includes an indicator circuit having a first indicator and a second indicator, a networking chipset including a first port for outputting a network type signal, a second port for outputting a linking status signal, and a third port for outputting a data transfer signal, and a driving circuit. The driving circuit includes a first transistor, a second transistor, and a power supply is capable of powering the first and second indicators. The second indicator is connected between the power supply and the third port to indicate data transfer status of the networking chipset. The first port and the second port are connected to the first indicator via the first transistor and the second transistor. The first transistor accepts the linking status signal to generate an assistant signal transferred to the second transistor. The second transistor accepts the network type signal, and compares the network type signal with the assistant signal to determine switching on or off the second transistor to control the indicator.

13 Claims, 1 Drawing Sheet

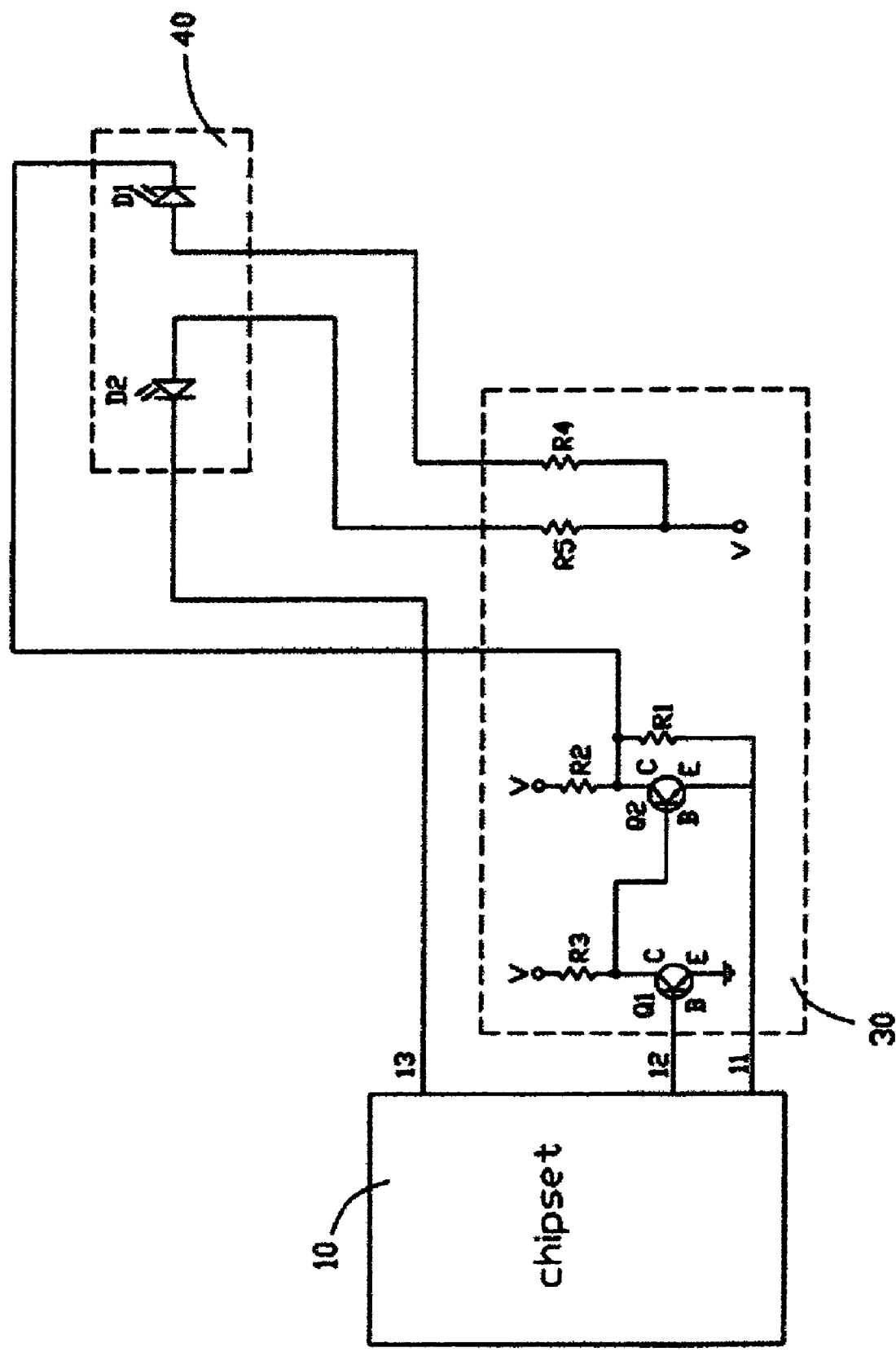

CIRCUIT FOR DRIVING NETWORK INDICATOR

FIELD OF THE INVENTION

The present invention relates to indicator circuits, and particularly to a circuit which can drive a network indicator to show working status of a network.

DESCRIPTION OF RELATED ART

Recently, more and more people use internet network to deal with affairs, and the internet network plays a more and more important role in our lives. The internet network is used for meetings, watching films, playing games, and so on. Users naturally hope the networks will have a high data transfer speed. When optical fiber is used for an internet network to transfer data, and so data transfer rates have increased. For example, more and more network's bandwidth has from 10 MB to 100 MB.

In the past, networking chipsets that conform to 10 MB bandwidth were used in networking cards to connect computers to the internet network. Now, because of advances in the development of the internet network, some new networking chipsets that conform to 10 MB and 100 MB bandwidth simultaneously are developed to correspond to different networks. When the networking card that is configured for the new networking chipset is used, it is difficult to ascertain the bandwidth of the network that it is linked to.

What is needed, therefore, is a circuit that can indicate a status of the network that a computer is linked with.

SUMMARY OF THE INVENTION

A circuit assembly for indicating statuses of a network includes an indicator circuit having a first indicator and a second indicator, a networking chipset including a first port for outputting a network type signal, a second port for outputting a linking status signal, and a third port for outputting a data transfer signal, and a driving circuit. The driving circuit includes a first transistor, a second transistor, and a power supply is capable of powering the first and second indicators. The second indicator is connected between the power supply and the third port to indicate data transfer status of the networking chipset. The first port and the second port are connected to the first indicator via the first transistor and the second transistor. The first transistor accepts the linking status signal to generate an assistant signal transferred to the second transistor. The second transistor accepts the network type signal, and compares the network type signal with the assistant signal to determine switching on or off the second transistor to control the indicator.

Other advantages and novel features will be drawn from the following detailed description of a preferred embodiment with attached drawings, in which:

BRIEF DESCRIPTION OF THE DRAWINGS

The drawing is a circuit diagram of a circuit for driving a network indictor.

DETAILED DESCRIPTION OF THE INVENTION

Referring to the drawing, a circuit in accordance with a preferred embodiment of the present invention is shown for indicating statuses of a network. The circuit includes a networking chipset 10, a driving circuit 30, and an indicator circuit 40.

The indicator circuit 40 includes a first LED D1 for indicating a type of the network, and a second LED D2 for indicating a data transfer status of the network.

The networking chipset 10 includes a first port 11 for outputting a network type signal, a second port 12 for outputting a linking status signal, and a third port 13 for outputting a data transfer signal.

The driving circuit 30 includes a first transistor Q1, a second transistor Q2, a power supply V, and a number of resistors R1, R2, R3, R4 and R5. The power supply V is provided with a high-level voltage. A base of the first transistor Q1 is coupled to the second port 12. An emitter of the first transistor Q1 is grounded. A collector of the first transistor Q1 is coupled to the power supply V via the resistor R3.

A base of the second transistor Q2 is coupled to a node between the resistor R3 and the collector of the first transistor Q1. An emitter of the second transistor Q2 is coupled to the first port 11. A collector of the second transistor Q2 is coupled to the power supply V via the resistor R2. The resistor R1 is coupled between the emitter and the collector of the second transistor Q2. The collector of the second transistor Q2 is coupled to a negative end of the first LED D1.

A positive end of the first LED D1 is coupled to the power supply V via the resistor R4. A positive end of the second LED D2 is coupled to the power supply V via the resistor R5. A negative end of the first LED D2 is coupled to the third port 13.

When the networking chipset 10 is not linked to a network, the second port 12 outputs a high level linking status signal. The first transistor Q1 conducts. A low level assistant signal is generated on the collector of the first transistor Q1, so the base of the second transistor Q2 is enabled at a low level. The second transistor Q2 is in an off state. The collector of the second transistor Q2 is enabled at a high level. The negative end of the first LED D1 is at a high level, so that the first LED D1 is not on. Simultaneously, no data is transferred by the networking chipset 10, so the third port 13 outputs a high level data transfer signal. Thus, the second LED D2 is not on.

When the networking chipset 10 is connected to a network, the second port 12 outputs a low level linking status signal. The first transistor Q1 is in an off state. A high level assistant signal is generated on the collector of the first transistor Q1, so the base of the second transistor Q2 is enabled at a high level.

If a bandwidth of the network is 10 MB, the first port 11 outputs a high level network type signal. The emitter of the second transistor Q2 is enabled at a high level. The voltage difference between the base and the emitter of the second transistor Q2 is too small to switch on the second transistor Q2. The collector of the second transistor Q2 is enabled at a high level, so the first LED D1 is not on thus indicating connection to the network with 10 MB of bandwidth.

If a bandwidth of the network is 100 MB, the first port 11 outputs a low level network type signal. The emitter of the second transistor Q2 is enabled at a low level. The voltage difference between the base and the emitter of the second transistor Q2 is large enough to switch on the second transistor Q2. The collector of the second transistor Q2 is enabled at a low level, so the first LED D1 conducts and lights to indicate connection to the network with 100 MB of bandwidth.

When the networking chipset 10 is connected to the network, and there is data transferred by the networking chipset 10, the third port 13 outputs a square-wave signal. The second LED D2 is switched between on and off, so the LED D2 flickers to indicate that the networking chipset 10 is transferring date.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A circuit assembly for indicating statuses of a network, comprising:
    an indicator circuit comprising a first indicator and a second indicator;
    a networking chipset comprising a first port for outputting a network type signal, a second port for outputting a linking status signal, and a third port for outputting a data transfer signal; and
    a driving circuit comprising a first transistor, a second transistor, and a power supply capable of powering the first and second indicators, the second indicator connected between the power supply and the third port to indicate data transfer status of the networking chipset, the first port and the second port connected to the first indicator via the first transistor and the second transistor to control the first indicator; a base of the first transistor capable of receiving the linking status signal from the second port, a collector of the first transistor outputting an assistant signal corresponding to the linking status signal, the assistant signal compared with the network type signal received by an emitter of the second transistor for controlling the conduction of the second transistor in order to light or unknot light the second LED to indicate the network's type.

2. The circuit assembly as described in claim 1, wherein the linking status signal indicates whether the networking chipset is connected to the network, and the network type signal indicates the bandwidth of the network.

3. The circuit assembly as described in claim 2, wherein the network type signal is at a high level when the bandwidth of the network is 10 MB, and the network type signal is at a low level when the bandwidth of the network is 100 MB.

4. The circuit assembly as described in claim 1, wherein the first and second indicators are LEDs.

5. The circuit assembly as described in claim 1, wherein a collector of the first transistor is coupled to the power supply via a resistor, and the collector of the second transistor is coupled to the power supply via another resistor.

6. The circuit assembly as described in claim 1, wherein a resistor is connected between the collector and an emitter of the second transistor.

7. A circuit assembly for indicating statuses of a network, comprising:
    a networking chipset providing a network type signal definably corresponding to a type of the network;
    a first indicator definably corresponding to the type of the network;
    a driving circuit comprising a second transistor, and a power supply capable of powering the first indicator, the first indicator electrically connectable in series between the power supply and the second transistor; and
    the circuit assembly further comprising a first transistor, wherein the networking chipset provides a linking status signal, the linking status signal is transferred to the first transistor to generate the assistant signal; and the networking chipset comprises a first port for outputting the network type signal and a second port for outputting the linking status signal, an emitter of the second transistor is coupled to the first port of the networking chipset, a base of the first transistor is coupled to the second port of the networking chipset;
    wherein the second transistor receives the network type signal from said networking chipset and an assistant signal, and compares the network type signal with the assistant signal to determine switching on or off the second transistor to control the first indicator.

8. The circuit assembly as described in claim 7, wherein the network type signal indicates the bandwidth of the network.

9. The circuit assembly as described in claim 8, wherein the network type signal is at a high level when the bandwidth of the network is 10 MB, and the network type signal is at a low level when the bandwidth of the network is 100 MB.

10. The circuit assembly as described in claim 7, further comprising a second indicator capable of accepting a data transfer signal from the networking chipset.

11. The circuit assembly as described in claim 7, wherein the assistant signal is a high-level signal.

12. The circuit assembly as described in claim 7, wherein the linking status signal indicates whether the networking chipset is connected to the network.

13. The circuit assembly as described in claim 7, wherein the assistant signal is generated on a collector of the first transistor, and transferred to a base of the second transistor.

\* \* \* \* \*

UNITED STATES PATENT AND TRADEMARK OFFICE
CERTIFICATE OF CORRECTION

PATENT NO. : 7,656,306 B2
APPLICATION NO. : 11/308937
DATED : February 2, 2010
INVENTOR(S) : Xiang Zhang Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 889 days.

Signed and Sealed this

Thirtieth Day of November, 2010

David J. Kappos
*Director of the United States Patent and Trademark Office*